Aug. 26, 1958  O. E. MILLER  2,848,881
THERMALLY SHIELDED MOISTURE REMOVAL DEVICE
Filed Jan. 13, 1945  2 Sheets-Sheet 1

INVENTOR.
Oran E. Miller
BY
Robert A. Lavender
Attorney

Aug. 26, 1958   O. E. MILLER   2,848,881
THERMALLY SHIELDED MOISTURE REMOVAL DEVICE
Filed Jan. 13, 1945   2 Sheets-Sheet 2

INVENTOR.
Oran E. Miller
BY
Robert A. Lavender
Attorney

United States Patent Office 2,848,881
Patented Aug. 26, 1958

2,848,881

THERMALLY SHIELDED MOISTURE REMOVAL DEVICE

Oran E. Miller, Oak Ridge, Tenn., assignor, by mesne assignments, to the United States of America as represented by the United States Atomic Energy Commission Application January 13, 1945, Serial No. 572,722

11 Claims. (Cl. 62—270)

This invention is concerned with apparatus for removing moisture from the air within tanks or chambers which it is desired to evacuate to a relatively high degree of vacuum. The invention finds particular application, although it is not limited to this application, in isotope separating apparatus wherein the separating process is carried out in a tank which is evacuated of air and moisture to a relatively high degree. In this apparatus prior to the beginning of a cycle of the process the tank is evacuated to the desired degree of vacuum and this evacuating period is sometimes referred to as a "bake-out" period. During this period it is desirable and it has been the practice in the past to have within the tank or within the evacuating outlet conduit thereof a device at a relatively low temperature which will freeze out moisture from the air in the tank and this moisture will condense on the device in the form of frost. It has also been the practice in the past to use as this device a container or cell filled with liquid nitrogen which in liquid form is at a very low temperature. A device filled with liquid nitrogen is very adaptable to freezing out moisture from the air. However, after the bake-out period and during the process, for example an isotope separating process, there is little or no more moisture to be frozen out and it is desired that moisture already frozen out be not allowed to get back into the air.

An object of my invention is to have the device at low temperature operative only during the bake-out period and to render it inoperative by having it insulated or thermally shielded during the time the process is going on.

Another object of my invention is to provide a moisture removal device in the form of a cell filled with a cooling medium at a relatively low temperature and thermal shielding means which can be moved between positions wherein the device is thermally shielded and where it is not thermally shielded.

Another object of the invention is to provide a device as in the previous object wherein the thermal shielding means consist of a pair of hinged jaws arranged to close over the cell filled with cooling medium and to open relative thereto to expose it to the circumambient atmosphere.

Another object of the invention is to provide a device as in the previous object wherein the cell is filled with liquid nitrogen and the means for operating the thermal shield comprise a recpirocatable stem extending through a side wall of the evacuated tank and sealed by means of a collapsible sylphon bellows.

Further objects and numerous of the advantages of my invention will become apparent from the following detailed description and anexed drawings wherein Fig. 1 is a side elevational view of the device of my invention with the thermal shield in closed position.

Figure 1:
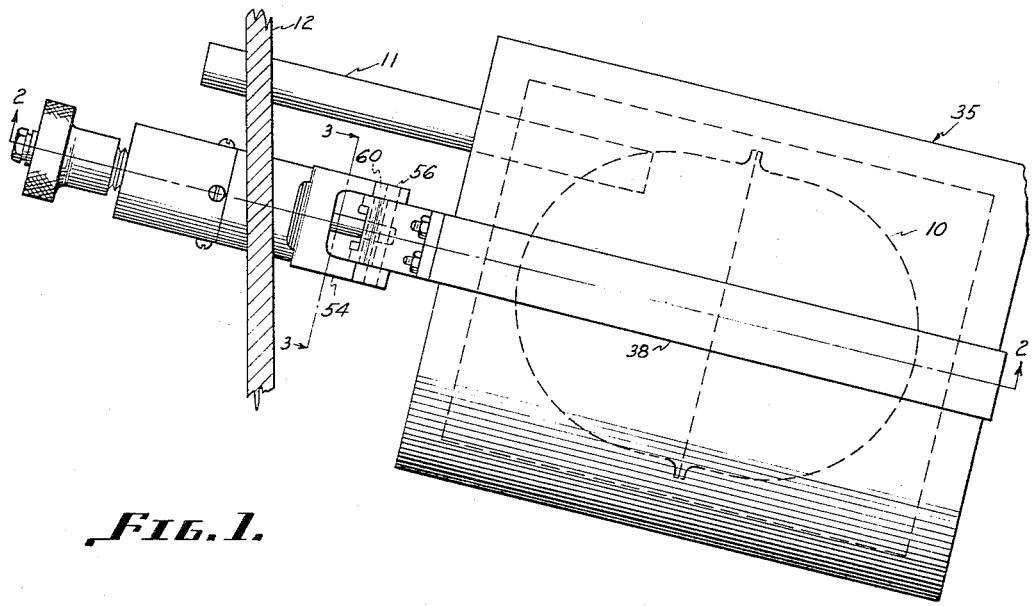
Figure 2:
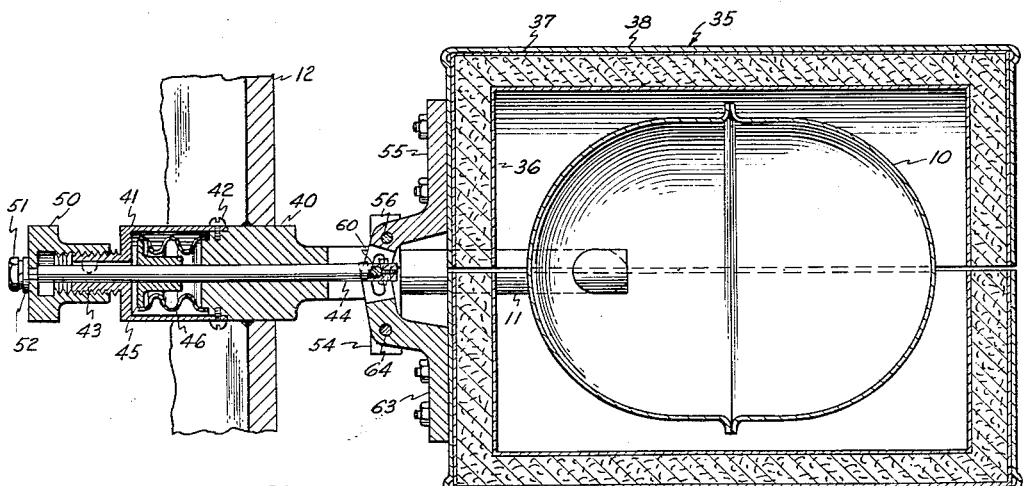
Fig. 2 is a sectional view of the device of Fig. 1 taken along the line 2—2 of Fig. 1.

Referring to Figs. 1 and 2 of the drawings, numeral 10 indicates an oval shaped cell for containing liquid nitrogen which may be put into the cell through a filler pipe 11 which is preferably rigid enough to support the cell 10 by itself. The filler pipe 11 extends through a side wall 12 of an evacuated tank or through a side wall of an evacuating outlet conduit from the tank. The filler pipe 11 may extend through and be fastened to a rectangular face plate which sealingly attaches to a side wall of the tank or to the evacuating outlet conduit.

Figure 4:
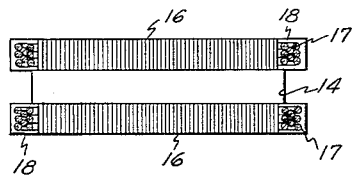
Fig. 4 is a diagrammatic sectional view of part of the apparatus of Fig. 5, taken along line 4—4.
Figure 5:
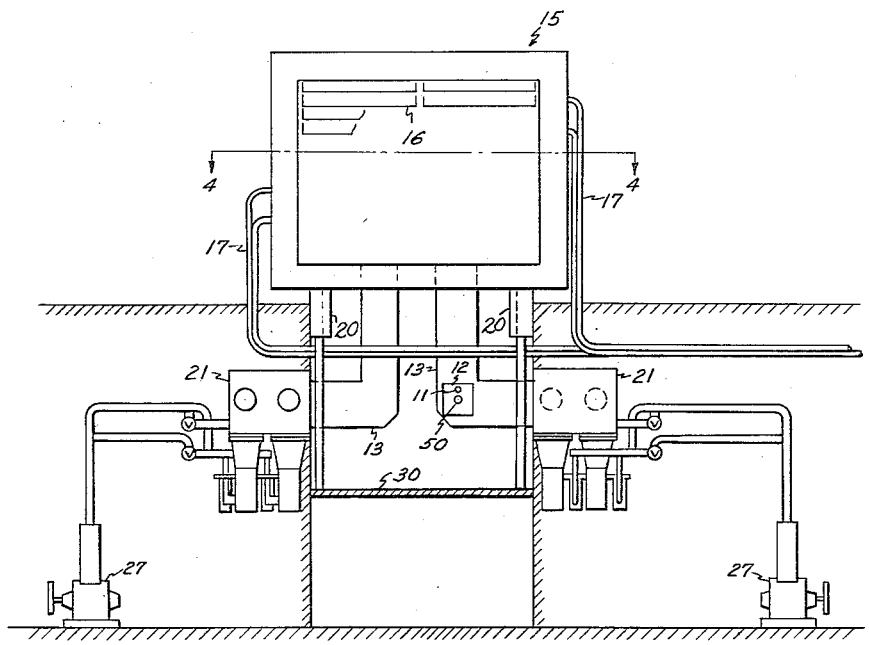
Fig. 5 is a schematic showing of an isotope separating plant indicating the position therein occupied by the device of Figs. 1 and 2.

The general position of the cell 10 is indicated as shown on Fig. 5 of the drawing. In this figure the cell occupies a position within an evacuating outlet conduit 13 from a tank 14 forming part of an isotope separating apparatus. The apparatus comprises the tank 14 between laminated iron cores or pole pieces 16 as may be seen on Fig. 4. These pole pieces are surrounded by electrical coil windings 17 which are energized by an electric current so that a relatively intense magnetic field is produced which is transverse to the cores 16 and the tank 14. The coils 17 are preferably within casings or housings 18 as shown.

The tank structure is supported from standards or uprights 20 and the tank 14 is evacuated through evacuating outlet conduits 13 which connect to oil diffusion pumps indicated at 21.

Diffusion pumps 21 are backed by, that is, they are connected to mechanical pumps of the rotary type indicated by the numeral 27.

While the device of my invention is shown in only one of the evacuating outlet conduits 13 it of course may be provided in both of the conduits and it may have other positions in the system, that is, it could be placed within the tank 14 itself. When it is in the position as shown in Fig. 5, however, it is conveniently located for the purpose of filling with cooling medium which preferably is liquid nitrogen which can be transported to the cell, that is, to the liquid nitrogen trap by means of a small hand-drawn tank dolly movable along a platform or level indicated by the numeral 30.

Referring again to Figs. 1 and 2 of the drawings, the trap or cell 10 is shown inclosed within a thermal shield or insulated housing which is rectangular in cross section as indicated at 35. The thermal shield 35 is formed in two halves as may best be seen on Fig. 2, each half comprising an interior casing 36 made of metal and an outer casing 37. Numeral 38 designates a reinforcing strip extending around each half. The space between these casings is filled with a suitable insulating material which may be any one of various types and in the preferred form of my invention I use material consisting of alternate layers of metal foil and insulating material.

The two halves of the shield 35 open in the manner of a pair of jaws. That is, they fit over the cell 10 with a clam shell-like effect as will presently be explained. The two jaws swing in the plane of the paper looking at Fig. 2 and they swing about an axis lying in the plane of the paper looking at Fig. 1. The two halves have depressions where filler pipe 11 extends through the shield to permit it to pass through.

The thermal shield 35 is supported from a bushing 40 which extends through and is sealed to the plate 12. The part of the bushing 40 outside of the face plate has two annular shoulders as shown and to one of these is attached a cylindrical cap 41 by screws 42 as shown, the cap 41 having a screw threaded nipple 43 at its left end.

A reciprocatable stem 44 extends entirely through the bushing 40 and through a plug 45 which is within the cap 41. Nipple 43 is keyed to stem 44 as shown so stem 44 does not rotate. The roller 45 is sealed to the stem 44 and also to one end of a collapsible sylphon bellows 46, the other end of which is sealed to another of the annular shoulders on the end of bushing 40. It is seen, therefore, that the stem 44 can be hermetically sealed at the point where it passes through the plate 12 so that the interior of the tank of which plate 12 is a part is entirely sealed.

Engaging the screw threaded nipple 43 is a knurled knob 50 and the stem 44 extends through the knob 50, the end of the stem being slightly smaller in diameter where it passes through the knob and being attached to the knob by a nut 51 and a lock washer 52. From the above it is to be seen that if the knob 50 is turned in either direction on the nipple 43 the stem 44 must reciprocate in the same direction that the knob 50 moves.

Figure 3:
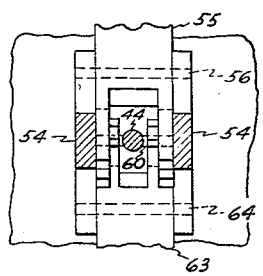
Fig. 3 is a view of a detail taken along line 3—3 of Fig. 1.

The manner of support of the thermal shield 35 and the manner in which it moves away from the cell 10 will now be described. The right end of the bushing 40 is bifurcated to form a yoke as shown at 54. Numeral 55 designates a hinged bracket which is attached by bolts to the upper half of thermal shield 35 as shown and which is in the form of a bell crank lever. The lever 55 swings about a shaft or pivot 56 which is journalled in or between the arms of the yoke 54 formed at the end of bushing 40. The lower arm of lever 55 is also bifurcated and it straddles the end of stem 44 and its bifurcations are slotted or forked so as to straddle a shaft or pivot 60 which passes through the end of shaft or stem 44 and engages the slots in the bifurcations at the lower end of lever 55. See Fig. 3. Shaft or pin 60 is held in place by a small set screw as shown.

Numeral 63 designates a similar bell crank lever attached to the lower half of thermal shield 35 and this lever pivots correspondingly to lever 55 about a shaft or pivot 64 journalled in yoke 54 and the upper arm of lever 63 is similarly bifurcated to form a yoke. This yoke also straddles the end of stem 44 and its bifurcations or ends are slotted and straddle the pin or shaft 60 which fits into the slots.

With the parts in the position shown in Figs. 1 and 2, the thermal shield is in a position completely enclosing the trap or cell 10 so as to inhibit or retard the flow of heat to the trap and to prevent the accumulation of moisture or frost therein. Thus the rate of evaporation of liquid nitrogen within the trap is very greatly retarded and the consumption of the liquid nitrogen is very measurably lessened. The trap or cell 10 is enclosed or sealed in the manner shown during that part of the cycle after the bake-out period, as described above when the tank has been brought down to the desired degree of vacuum. After the process, such as an isotope separating process, begins within the tank, since the interior of the tank is already down to the desired vacuum, further consumption of liquid nitrogen would be inefficient and expensive without commensurately useful results. It is desired to prevent re-evaporation of frost already accumulated.

To move the thermal shield away from the trap to expose it to the surrounding atmosphere during the bake-out period the knurled knob 50 is turned down on the nipple 43. The knob 50 thus moves to the right and stem 44 is also moved to the right. This exerts a thrust against the pin or shaft 60 causing the bell crank levers 55 and 63 to rotate on the shafts or pins 56 and 64. That is, the upper half of the shield 35 now rotates in a counter-clockwise direction and the lower half rotates in a clockwise direction, the halves of the shield moving away from the cell 10 in the manner of a pair of jaws and thus exposing it to the surrounding atmosphere so that it can extract moisture therefrom by freezing it out. The moisture collects on the trap or cell 10 in the form of frost. At the termination of the bake-out period the thermal shield can be operated back into the position as shown in Figs. 1 and 2 by rotating the knurled knob in the opposite direction, that is, to withdraw or move the stem 44 outwardly. The bell crank levers and the halves of the shield 35 now rotate in the opposite directions back into the positions as shown in the Figs. 1 and 2. Thus any frost accumulated on the trap or cell 10 is enclosed within the thermal shield and it is prevented from being allowed to go back into the atmosphere in the tank during the time that the process is going on therewithin. After the termination of the cycle of the process the frost can be removed from the trap or the trap as a whole can be removed from the conduit 13 for servicing.

My arrangement provides for great economy in the use of liquid nitrogen in the trap resulting in a commensurate financial saving. The efficiency is further improved due to the fact that any moisture which has once been frozen out of the air in the tank is prevented from getting back into the air and thereby nullifying results previously achieved by liquid nitrogen already consumed. The sylphon bellows seal obviates the need of a sliding or friction seal for the operating stem.

The form of my invention which I have disclosed herein is representative of the preferred embodiment and it is intended that the disclosure be interpreted in an illustrative rather than a limiting sense and that the invention be limited only in accordance with the scope of the claims appended hereto.

I claim:

1. In apparatus of the character described, in combination, means comprising an evacuated tank, means for evacuating said tank, means for extracting moisture from within said tank comprising a vessel containing a cooling medium at a relatively low temperature for freezing out moisture from the air in said tank, thermal shielding means for said vessel movable into and out of thermal shielding position, and means for operating said thermal shielding means.

2. In apparatus of the character described, in combination, means comprising an evacuated tank, means for evacuating said tank, means for extracting moisture from within said tank comprising a vessel containing a cooling medium at a relatively low temperature for freezing out moisture from the air in said tank, thermal shielding means for said vessel movable into and out of thermal shielding position, said thermal shielding means comprising a hinged portion operable to move about its hinge into and out of thermal shielding position and means comprising a stem extending to a point externally of said tank for operating said hinged portion.

3. In apparatus of the character described, in combination, means comprising an evacuated tank, means for evacuating said tank, means for extracting moisture from within said tank comprising a vessel containing a cooling medium at a relatively low temperature for freezing out moisture from the air in said tank, thermal shielding means for said vessel movable into and out of thermal shielding position, said thermal shielding means comprising a hinged portion operable to move about its hinge into and out of thermal shielding position, means comprising a stem extending to a point which is external to said tank for operating said hinged portion and means comprising a collapsible bellows for sealing said stem at the point where it extends through said tank.

4. In apparatus of the character described, in combination, means comprising an evacuated tank, means for evacuating said tank, means for extracting moisture from within said tank comprising a vessel containing a cooling medium at a relatively low temperature for freezing out moisture from the air in said tank, thermal shielding means for said vessel movable into and out of thermal shielding position, said thermal shielding means comprising two hinged portions so arranged as to be operable to swing about their hinges in the manner of a pair of jaws into and out of thermal shielding relationship with reference to said vessel, and means for operating said hinged portions including a movable stem engageable with said hinged portions and extending through a side wall of said tank to a point exterior thereof.

5. In apparatus of the character described, in combination, means comprising an evacuated tank, means for evacuating said tank, means for extracting moisture from within said tank comprising a vessel containing a cooling medium at a relatively low temperature for freezing out moisture from the air in said tank, thermal shielding means for said vessel movable into and out of thermal shielding position, said thermal shielding means comprising two hinged portions so arranged as to be operable to swing about their hinges in the manner of a pair of jaws into and out of thermal shielding relationship with reference to said vessel and remote control operating means comprising a movable stem engaged with said hinged portions for moving them and extending through a side wall of said tank to a point exterior thereof and means comprising a collapsible bellows for sealing said stem at the point where it passes through a side wall of said tank.

6. In apparatus of the character described, in combination, means comprising an evacuated tank, means for evacuating said tank, means for extracting moisture from within said tank comprising a vessel containing liquid nitrogen for freezing out moisture from the air in said tank, thermal shielding means for said vessel movable into and out of thermal shielding position, and means for operating said thermal shielding means.

7. In apparatus of the character described, in combination, means comprising an evacuated tank, means for evacuating said tank, means for extracting moisture from within said tank comprising a vessel containing liquid nitrogen for freezing out moisture from the air in said tank, thermal shielding means for said vessel movable into and out of thermal shielding position, and means for remote operation of said thermal shielding means, said operating means comprising a reciprocatable stem connected to said thermal shielding means and extending therefrom through a side wall of said tank and means comprising a collapsible bellows for sealing said stem at the point where it passes through a side wall of said tank.

8. In apparatus of the character described, in combination, means comprising an evacuated tank, means for evacuating said tank, means for extracting moisture from within said tank comprising a vessel containing liquid nitrogen for freezing out moisture from the air in said tank, thermal shielding means for said vessel movable into and out of thermal shielding position, said thermal shielding means comprising a hinged portion operable to move about its hinge into and out of thermal shielding position and means comprising a stem extending to a point which is external to said tank for operating said hinged portion.

9. In apparatus of the character described, in combination, means comprising an evacuated tank, means for evacuating said tank, means for extracting moisture from within said tank comprising a vessel containing liquid nitrogen for freezing out moisture from the air in said tank, thermal shielding means for said vessel movable into and out of thermal shielding position, said thermal shielding means comprising a hinged portion operable to move about its hinge into and out of thermal shielding position, means comprising a stem extending to a point externally of said tank for operating said hinged portion and means comprising a collapsible bellows for sealing said stem at the point where it extends through said tank.

10. In apparatus of the character described, in combination, means comprising an evacuated tank, means for evacuating said tank, means for extracting moisture from within said tank comprising a vessel containing liquid nitrogen for freezing out moisture from the air in said tank, thermal shielding means for said vessel movable into and out of thermal shielding position, said thermal shielding means comprising two hinged portions so arranged as to be operable to swing about their hinges in the manner of a pair of jaws into and out of thermal shielding relationship with reference to said vessel and operating means comprising an operating stem having a portion operably connected to said hinged portions and extending through a side wall of said tank to a point exterior thereof for manual operation.

11. In apparatus of the character described, in combination, means comprising an evacuated tank, means for evacuating said tank, means for extracting moisture from within said tank comprising a vessel containing liquid nitrogen for freezing out moisture from the air in said tank, thermal shielding means for said vessel movable into and out of thermal shielding position, said thermal shielding means comprising two hinged portions so arranged as to be operable to swing about their hinges in the manner of a pair of jaws into and out of thermal shielding relationship with reference to said vessel, operating means comprising an operating stem operably connected to said hinged portions adjacent one end and extending through a side wall of said tank to a point exterior thereof for remote control and means comprising a collapsible bellows for sealing said stem at the point where it passes through a side wall of said tank.

References Cited in the file of this patent

UNITED STATES PATENTS

| 1,894,638 | Schlumbohm | Jan. 17, 1933 |
| 2,187,387 | Trigg et al. | Jan. 16, 1940 |
| 2,217,702 | Kleist | Oct. 15, 1940 |
| 2,300,085 | Yunker | Oct. 27, 1942 |